United States Patent
Wang et al.

(10) Patent No.: US 11,451,313 B2
(45) Date of Patent: Sep. 20, 2022

(54) DETECTION METHOD AND USER EQUIPMENT

(71) Applicant: NTT DOCOMO, INC., Tokyo (JP)

(72) Inventors: Jing Wang, Beijing (CN); Liu Liu, Beijing (CN); Huiling Jiang, Beijing (CN); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,734

(22) PCT Filed: Mar. 21, 2018

(86) PCT No.: PCT/CN2018/079851
§ 371 (c)(1),
(2) Date: Sep. 19, 2019

(87) PCT Pub. No.: WO2018/171631
PCT Pub. Date: Sep. 27, 2018

(65) Prior Publication Data
US 2020/0028603 A1 Jan. 23, 2020

(30) Foreign Application Priority Data
Mar. 22, 2017 (CN) .......................... 201710175178.3

(51) Int. Cl.
*H04W 24/00* (2009.01)
*H04B 7/02* (2018.01)
(Continued)

(52) U.S. Cl.
CPC ......... *H04B 17/309* (2015.01); *H04B 7/0408* (2013.01); *H04W 24/08* (2013.01)

(58) Field of Classification Search
CPC .... H04B 17/309; H04B 7/0408; H04W 24/08
(Continued)

(56) References Cited

U.S. PATENT DOCUMENTS

2006/0153237 A1* 7/2006 Hwang ............... H04L 43/0823
370/469
2011/0244908 A1 10/2011 Morioka
(Continued)

FOREIGN PATENT DOCUMENTS

CN 103891161 A 6/2014
CN 104247291 A 12/2014
(Continued)

OTHER PUBLICATIONS

International Search Report from counterpart application PCT/CN2018/079851, including English translatione dated Jun. 6, 2018.
(Continued)

*Primary Examiner* — Mark G. Pannell
(74) *Attorney, Agent, or Firm* — Osha Bergman Watanabe & Burton LLP

(57) ABSTRACT

Disclosed is a method for detecting radio link failure (RLF) and user equipment (UE). The UE is configured with multiples pairs of beams, each pair of beams comprising a transmitting beam used by a base station (BS) to transmit a signal and a corresponding receiving beam used by the UE to receive the signal. The method includes: in a lower layer, measuring the quality of a reference signal received through a receiving beam in each pair of beams and transmitted by a BS using a transmitting beam corresponding to the receiving beam, to serve as the channel quality for the multiple transmitting beams included in the multiple pairs of beams; determining whether the channel quality for the multiple transmitting beams meets a first condition; if so, transmitting to an upper layer an Out-Of-Sync (OOS) indication information, such that the upper layer determines if, according to the OOS indication information, RLF has occurred. As such, the present invention enables detection of RLF in a multi-beam scenario.

4 Claims, 7 Drawing Sheets

(51) Int. Cl.
*H04B 17/309* (2015.01)
*H04B 7/0408* (2017.01)
*H04W 24/08* (2009.01)

(58) Field of Classification Search
USPC .......................................................... 455/424
See application file for complete search history.

(56) References Cited

U.S. PATENT DOCUMENTS

| | | | | |
|---|---|---|---|---|
| 2012/0063298 | A1* | 3/2012 | Yi | H04B 7/155 370/216 |
| 2012/0182879 | A1* | 7/2012 | Tamura | H04L 5/001 370/242 |
| 2013/0072243 | A1 | 3/2013 | Yu et al. | |
| 2013/0279437 | A1* | 10/2013 | Ng | H04L 25/0224 370/329 |
| 2013/0301454 | A1 | 11/2013 | Seol et al. | |
| 2015/0049600 | A1* | 2/2015 | Balasubramanian | H04W 76/40 370/216 |
| 2015/0156657 | A1* | 6/2015 | Ji | H04W 56/001 370/228 |
| 2015/0334637 | A1* | 11/2015 | Kim | H04W 48/12 370/312 |
| 2017/0127357 | A1* | 5/2017 | Kobayashi | H04W 52/146 |
| 2017/0207845 | A1* | 7/2017 | Moon | H04B 7/0695 |
| 2018/0062770 | A1* | 3/2018 | Reial | H04W 16/28 |
| 2018/0160409 | A1 | 6/2018 | Park et al. | |
| 2018/0192371 | A1* | 7/2018 | Jung | H04W 72/046 |
| 2019/0200249 | A1* | 6/2019 | Yoon | H04W 24/08 |
| 2019/0306847 | A1* | 10/2019 | Seo | H04L 5/0053 |
| 2020/0053633 | A1 | 2/2020 | Ng et al. | |

FOREIGN PATENT DOCUMENTS

| | | |
|---|---|---|
| CN | 104412519 A | 3/2015 |
| CN | 106470062 A | 3/2017 |
| JP | 2011-223135 A | 11/2011 |
| JP | 2014-093651 A | 5/2014 |
| JP | 2014-526837 A | 10/2014 |
| JP | 2015-534784 A | 12/2015 |

OTHER PUBLICATIONS

International Preliminary Report on Patentability from counterpart application PCT/CN2018/079851, including English translation of the Written Opinion, dated Sep. 24, 2019.
Mediatek Inc., "RLM and RLF in HF NR". 3GPP TSG-RAN WG2 #97, R2-1700898. Feb. 17, 2017 (Feb. 17, 2017) Sections 1 -2.
Office Action issued in the counterpart Japanese Patent Application No. 2019-552039, dated Oct. 27, 2020 (6 pages).
Extended European Search Report issued in counterpart European Patent Application No. 18771089.2, dated Oct. 15, 2020 (14 pages).
LG Electronics Inc.; "RLM and RLF"; 3GPP TSG-RAN2 Meeting #97, R2-1701968; Athens, Greece; Feb. 13-17, 2017 (2 pages).
Samsung; "Motivation and Considerations of Beam Recovery"; 3GPP TSG-RAN WG2 Meeting #96, R2-167945; Reno, USA; Nov. 14-18, 2016 (6 pages).
LG Electronics Inc.; "Discussion on RRM measurement in NR"; 3GPP TSG RAN WG1 Meeting #88, R1-1702443; Athens, Greece; Feb. 13-17, 2017 (6 pages).
Notice of Reasons for Refusal issued in Japanese Application No. 2019-552039, dated Mar. 30, 2021 (8 pages).
Office Action in counterpart Chinese Patent Application No. 201880019680.8 dated Jun. 23, 2021 (14 pages).
Office Action issued in the counterpart Japanese Patent Application No. 2019-552039, dated Aug. 17, 2021 (10 pages).
MediaTek Inc.; "RLM and RLF in HF NR"; 3GPP TSG-RAN WG2 #97, R2-1700898; Athens, Greece; Feb. 13-17, 2017 (5 pages).
Office Action issued in Japanese Application No. 2019-552039; dated Jan. 25, 2022 (7 pages).
Office Action in counterpart Chinese Patent Application No. 201880019680.8 dated Jan. 4, 2022 (18 pages).

* cited by examiner

DETECTION METHOD AND USER EQUIPMENT

CROSS-REFERENCE TO RELATED APPLICATIONS

This patent application is a 371 U.S. National Phase of International Application No. PCT/CN2018/079851, filed on Mar. 21, 2018, which claims priority to Chinese Patent Application No. 201710175178.3 filed on Mar. 22, 2017. The entire disclosures of the above applications are incorporated herein by reference

TECHNICAL FIELD

The present disclosure relates to radio link failure detection, and more particularly to a method for detecting radio link failures in a multi-beam scenario and a user equipment thereof.

BACKGROUND

In a Long Term Evolution (LTE), a channel quality for a downlink between a User Equipment (UE) and a Base Station (BS) may be degraded due to changes in a radio environment, etc., resulting in a radio link failure (RLF), which affects a communication between the user equipment and the base station. To avoid this problem, the UE monitors the channel quality for the downlink to detect the radio link failure (RLF), and performs a RRC re-establishment when the RLF is detected.

Specifically, the UE measures a radio quality for a downlink channel (e.g., a downlink control channel (PDCCH)) in a L1/L2 layer periodically, and compares the radio quality with a threshold $Q_{out}$. If the radio quality is lower than $Q_{out}$, an Out-Of-Sync (OOS) indication is transmitted from the L1/L2 layer to a L3 layer. If the L3 layer consecutively receives N310 Out-Of-Sync indications, a T310 timer is started. Then, the UE compares the radio quality with a threshold $Q_{in}$, and if the radio quality is higher than $Q_{in}$, an In-Sync (IS) indication is transmitted from the L1/L2 layer to the L3 layer. If the L3 layer consecutively receives N311 In-Sync indications during the T310 is on, it may determine that no RLF occurs and the T310 timer is terminated. On the other hand, if not N311 In-Sync indications are consecutively received before the T310 is expired, it may determine that the RLF occurs. Subsequently, the UE starts a RRC re-establishment process.

In a new radio access system, a multi-beam technique is employed in which the base station may transmit a signal to the UE with a plurality of transmitting beams, and the UE may receive the signal transmitted by the base station with a plurality of receiving beams. However, no methods for detecting the RLF have been proposed in such a multi-beam scenario.

SUMMARY

According to an embodiment of the present disclosure, there is provided a method for detecting a radio link failure performed by a user equipment, the user equipment being configured with a plurality of beam pairs, each beam pair comprising one transmitting beam used by a base station to transmit a signal and one corresponding receiving beam used by the user equipment to receive the signal, the method comprises: measuring, in a lower layer, a quality of a reference signal received with the receiving beam of the each beam pair and transmitted by the base station with the transmitting beam corresponding to the receiving beam, as channel qualities for the plurality of transmitting beams included in the plurality of beam pairs; determining whether the channel qualities for the plurality of transmitting beams satisfy a first condition; and transmitting an Out-Of-Sync (OOS) indication information to an upper layer in case where the channel qualities for the plurality of transmitting beams satisfy the first condition, such that the upper layer determines whether the radio link failure occurs according to the OOS indication information.

According to another embodiment of the present disclosure, there is provided a user equipment, configured with a plurality of beam pairs, each beam pair comprising one transmitting beam used by a base station to transmit a signal and one corresponding receiving beam used by the user equipment to receive the signal, the user equipment comprises: a measuring unit configured to measure, in a lower layer, a quality of a reference signal received with the receiving beam of the each beam pair and transmitted by the base station using the transmitting beam corresponding to the receiving beam, as channel qualities for the plurality of transmitting beams included in the plurality of beam pairs; a determining unit configured to determine whether the channel qualities for the plurality of transmitting beams satisfy a first condition; and a transmitting unit configured to transmit an Out-Of-Sync (OOS) indication information to an upper layer in case where the determining unit determines that the channel qualities for the plurality of transmitting beams satisfy the first condition, such that the upper layer determines whether the radio link failure occurs according to the OOS indication information. It should be noted that the plurality of beam pairs configured for the user may be a same type of the beam pairs or different types of the beam pairs.

According to another embodiment of the present disclosure, there is provided a method for detecting a radio link failure performed by a user equipment, the user equipment being configured with a plurality of first beam pairs and a plurality of second beam pairs, each first beam pair comprising one transmitting beam, with a first type, used by a base station to transmit a signal and one corresponding receiving beam, with a second type, used by the user equipment to receive the signal, each second beam pair comprising one transmitting beam, with the second type, used by the base station to transmit the signal and one corresponding receiving beam, with the second type, used by the user equipment to receive the signal, the method comprising: measuring, in a lower layer, a quality of a reference signal received with the receiving beam with the first type of each first beam pair and transmitted by the base station using the transmitting beam with the first type corresponding to the receiving beam with the first type, as channel qualities for the plurality of transmitting beams with the first type included in the plurality of first beam pairs, and measuring a quality of a reference signal received with the receiving beam with the second type of each second beam pair and transmitted by the base station using the transmitting beam with the second type corresponding to the receiving beam with the second type, as channel qualities for the plurality of transmitting beams with the second type included in the plurality of second beam pairs; determining whether the channel qualities for the plurality of transmitting beams with the first type satisfy a first condition, and determining whether the channel qualities for the plurality of transmitting beams with the second type satisfy a second condition; transmitting an Out-Of-Sync (OOS) indication information to an upper layer, in case where the channel qualities for the plurality of transmitting beams with the first type satisfy the first condition, and/or the channel qualities for the plurality of the transmitting beams with the second type satisfy the second condition, such that the upper layer determines whether the radio link failure occurs according to the OOS indication information.

According to another embodiment of the present disclosure, there is provided a method for detecting a radio link failure performed by a user equipment, the user equipment being configured with a plurality of first beam pairs and a plurality of second beam pairs, each first beam pair comprising one transmitting beam, with a first type, used by a base station to transmit a signal and one corresponding receiving beam, with s second type, used by the user equipment to receive the signal, each second beam pair comprising one transmitting beam, with the second type, used by the base station to transmit the signal and one corresponding receiving beam, with the second type, used by the user equipment to receive the signal, the method comprising: receiving, at an upper layer, a first number of first Out-Of-Sync indications information and a second number of second Out-Of-Sync indication information transmitted from a lower layer, wherein the first Out-Of-Sync indication information is transmitted in case where channel qualities for the plurality of transmitting beams with the first type, obtained by measuring a quality of a reference signal received with the receiving beam with the first type of the each first beam pair and transmitted by the base station using the transmitting beam with the first type corresponding to the receiving beam with the first type, satisfy a first condition, and the second Out-Of-Sync indication information is transmitted in case where channel qualities for the plurality of transmitting beams with the second type, obtained by measuring a quality of a reference signal received with the receiving beam with the second type of each second beam pair and transmitted by the base station using the transmitting beam with the second type corresponding to the receiving beam with the second type, satisfy a second condition; in the upper layer, determining whether the radio link failure occurs according to the first number of first Out-Of-Sync indication information and/or the second number of second Out-Of-Sync indication information.

According to another embodiment of the present disclosure, there is provided a user equipment, configured with a plurality of first beam pairs and a plurality of second beam pairs, each first beam pair comprising one transmitting beam, with a first type, used by a base station to transmit a signal and one corresponding receiving beam, with a second type, used by the user equipment to receive the signal, each second beam pair comprising one transmitting beam, with the second type, used by the base station to transmit the signal and one corresponding receiving beam, with the second type, used by the user equipment to receive the signal, the user equipment comprising: a measuring unit configured to measure, in a lower layer, a quality of a reference signal received with the receiving beam with the first type of each first beam pair and transmitted by the base station using the transmitting beam with the first type corresponding to the receiving beam with the first type, as channel qualities for the plurality of transmitting beams with the first type included in the plurality of first beam pairs, and measure a quality of a reference signal received with the receiving beam with the second type of each second beam pair and transmitted by the base station using the transmitting beam with the second type corresponding to the receiving beam with the second type, as channel qualities for the plurality of transmitting beams with the second type included in the plurality of second beam pairs; a determining unit configured to determine whether the channel qualities for the plurality of transmitting beams with the first type satisfy a first condition, and determining whether the channel qualities for the plurality of transmitting beams with the second type satisfy a second condition; a transmitting unit configured to transmit an Out-Of-Sync (OOS) indication information to an upper layer, in case where the determining unit determines that the channel qualities for the plurality of transmitting beams with the first type satisfy the first condition, and/or the channel qualities for the plurality of transmitting beams with the second type satisfy the second condition, and the upper layer determines whether the radio link failure occurs according to the OOS indication information.

According to another embodiment of the present disclosure, there is provided a user equipment, configured with a plurality of first beam pairs and a plurality of second beam pairs, each first beam pair comprising one transmitting beam, with a first type, used by a base station to transmit a signal and one corresponding receiving beam, with the first type, used by the user equipment to receive the signal, each second beam pair comprising one transmitting beam, with a second type, used by the base station to transmit the signal and one corresponding receiving beam, with the second type, used by the user equipment to receive the signal, the user equipment comprising: a receiving unit configured to receive, at an upper layer, a first number of first Out-Of-Sync indications information and a second number of second Out-Of-Sync indication information transmitted from a lower layer, wherein the first Out-Of-Sync indication information is transmitted in case where channel qualities for the plurality of transmitting beams with the first type, obtained by measuring a quality of a reference signal received with the receiving beam with the first type of each first beam pair and transmitted by the base station using the transmitting beam with the first type corresponding to the receiving beam with the first type, satisfy a first condition, and the second Out-Of-Sync indication information is transmitted in case where channel qualities for the plurality of transmitting beams with the second type, obtained by measuring a quality of a reference signal received with the receiving beam with the second type of each second beam pair and transmitted by the base station using the transmitting beam with the second type corresponding to the receiving beam with the second type, satisfy a second condition; a determining unit configured to determine, in the upper layer, whether the radio link failure occurs according to the first number of first Out-Of-Sync indication information and/or the second number of second Out-Of-Sync indication information.

BRIEF DESCRIPTION OF THE DRAWINGS

The foregoing and other objects, features and advantages of the present disclosure will become more apparent from the detailed description of embodiments of the present disclosure in conjunction with the accompanying drawings. The drawings are included to provide a further understanding of the embodiments of the present disclosure, constitute a part of this specification, and help to explain the present disclosure together with the embodiments of the present disclosure, but are not intended to act as a limitation of the present disclosure. In the drawings, like reference numerals usually indicate like components or steps.

DETAILED DESCRIPTION

In order to make the objects, the technical solutions and the advantages of the present disclosure more apparent, the exemplary embodiments according to the present disclosure will be described in detail below with reference to the accompanying drawings.

Figure 1:
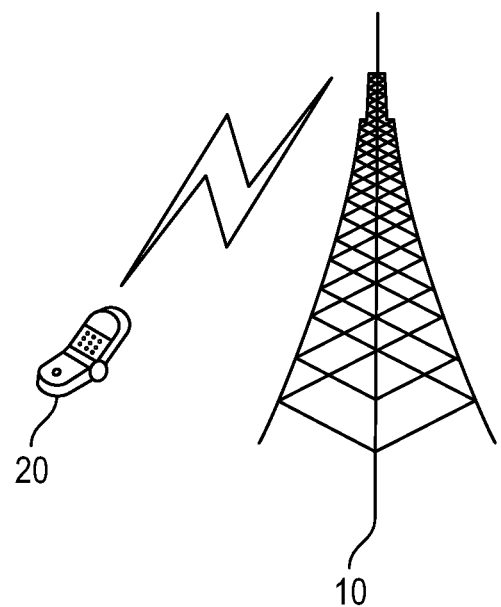
FIG. 1 is a schematic diagram of a mobile communication system according to an embodiment of the present disclosure.

First, a radio communication system to which an embodiment of the present disclosure could be applied will be described with reference to FIG. 1. As shown in FIG. 1, the radio communication system includes a base station (BS) 10 and a user equipment (UE) 20. The UE 20 receives a signal transmitted by the base station 10 and transmits a signal to the base station 10. It should be understood that although only one base station and one UE are shown in FIG. 1, this is merely illustrative and the radio communication system may include a plurality of base stations and/or a plurality of UEs. It should be understood that the base station may also be referred to as a transmitting and receiving point (TRP), and the UE may also be referred to as a mobile station (MS) or a user terminal.

In a multi-beam scenario, a plurality of beam pairs are configured for the user equipment. Specifically, the base station may transmit a signal to the UE by a plurality of transmitting beams and the UE may receive the signal transmitted by the base station by a plurality of receiving beams.

Figure 2A:
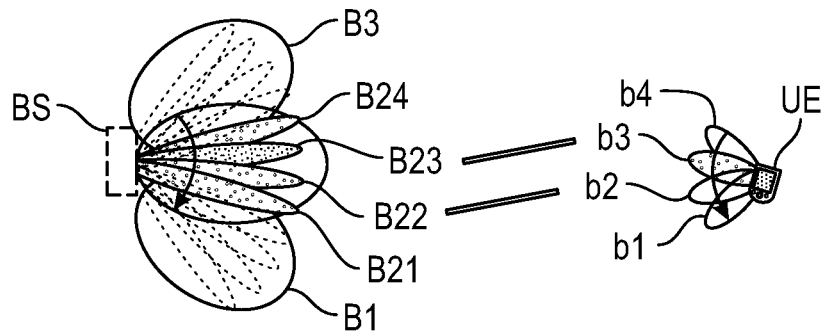
FIGS. 2A and 2B are schematic diagrams of beams used in communication between a base station and a user equipment.

The transmitting beam and the receiving beam may be beams with a first type, and the beam with the first type is used for transmitting downlink control channels (PDCCHs) and/or downlink data channels (PDSCHs), CSI-RSs for performing CSI measurement and reporting and/or L1 layer reference signal received power (RSRP) measurement and reporting (i.e. beam management), and performing radio resource management measurements, and the like. As shown in FIG. 2A, the base station may use the transmitting beams B21, B22, B23 and/or B24 with the first type to transmit data to the UE. The transmitting beams may include service beams (e.g., B22 and B23) and candidate beams (e.g., B21 and B24). When transmitting data, the base station schedules in the serving beams dynamically. When a beam failure event occurs on the serving beams, the base station may switch the serving beams to the candidate beams to perform a beam recovery. On the other hand, the UE may use one of the plurality of receiving beams b1, b2, b3, and b4 with the first type to receive data transmitted by the base station using a certain transmitting beam. Specifically, when the base station transmits data using a certain transmit beam (e.g., B22), the UE selects a receiving beam (e.g., b2) that may obtain a desired reception quality (e.g., an optimal reception quality) among the receiving beams b1-b4 to receive the data. In this case, the transmitting beam and the receiving beam form one beam pair. Similarly, for each transmitting beam, there is one corresponding receiving beam that may obtain the desired reception quality, whereby the plurality of transmitting beams and the plurality of receiving beams may form a plurality of beam pairs. Hereinafter, for convenience of description, the plurality of beam pairs formed by the beams with the first type may be referred to as a plurality of first beam pairs.

Figure 2B:
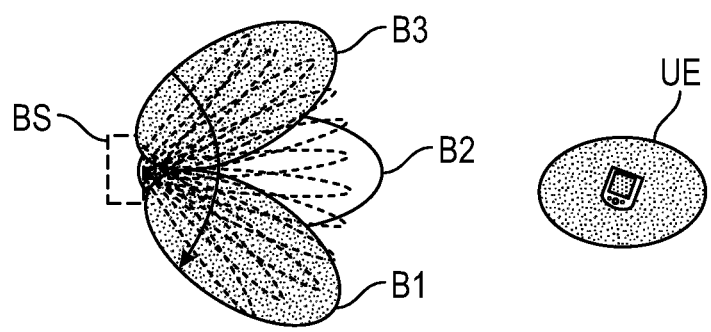

Alternatively, the transmitting beam and the receiving beam may be beams with a second type, for transmitting a sync-signal block (SS block), including a sync-signal or a physical broadcast channel. As shown in FIG. 2B, the base station may transmit a signal to the UE using the transmitting beams with the second type (e.g., B1, B2, or B3). Also, the transmitting beam with the second type may comprise serving beams and candidate beams, and the transmitting beam may be used and switched in the same manner as the beam with the first type. On the other hand, the UE may use one of a plurality of receiving beams with the second type (not shown in FIG. 2B) to receive signals transmitted by the base station using a certain transmit beam. Similarly, each transmitting beam and a receiving beam for which the transmitting beam may obtain the desired reception quality form one beam pair, thereby forming a plurality of beam pairs. Hereinafter, for convenience of description, the plurality of beam pairs formed by the beams with the second type may be referred to as a plurality of second beam pairs. As shown in FIG. 2A and 2B, generally, the beam with the second type is wider than beam with the first type, and therefore, hereafter, the beam with the first type is also referred to as a fine beam, and the beam with the second type is referred to as a rough beam. It should be understood that, when the user is configured to perform a downlink quality monitoring, the UE may be configured with only a plurality of first beam pairs or a plurality of second beam pairs, or a plurality of first beam pairs and a plurality of second beam pairs.

Hereinafter, embodiments of the present disclosure will be described in detail. In an embodiment of the present disclosure, the beam recovery operation described above is performed when the beam failure event occurs on the serving beams occur at the L1/L2 layer. In a case where certain conditions are met, it may determine that the beam recovery fails. At this time, an Out-Of-Sync (OOS) indication is transmitted from the L1/L2 layer to a L3 layer, such that the L3 layer may determine whether a radio link failure (RLF) occurs based at least in part on the Out-Of-Sync indication.

First, a method for detecting a RLF according to a first embodiment of the present disclosure will be described with reference to FIG. 3. The method may be performed by the UE. As described above, the UE is configured with the plurality of beam pairs, each beam pair includes one transmitting beam used by the base station to transmit the signal and one corresponding receiving beam used by the user equipment to receive the signal. The beams of the beam pairs may include only the beams with the first type, only the beams with the second type, or may include the beams both with the first type and the with the second type.

Figure 3:
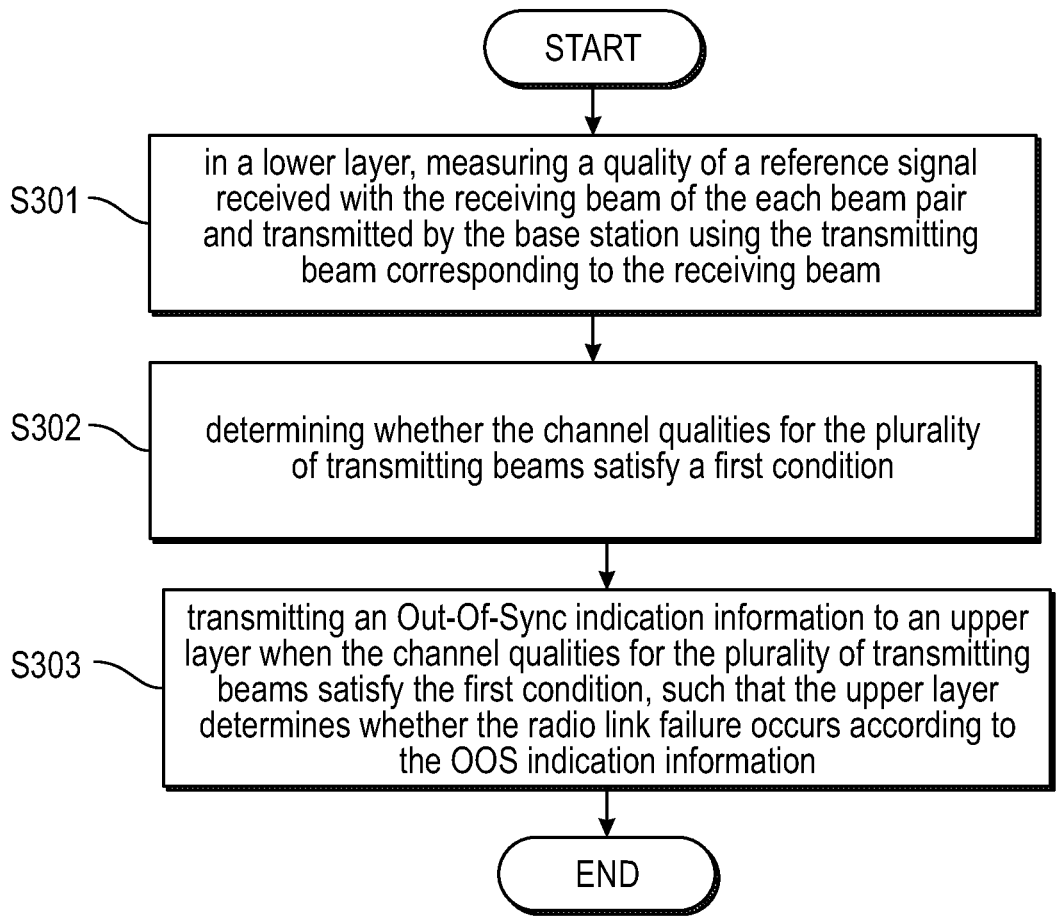
FIG. 3 is a flowchart of a method for detecting a RLF according to a first embodiment of the present disclosure.

As shown in FIG. 3, in step S301, in the L1/L2 layer, a quality of a reference signal received with the receiving beam of the each beam pair and transmitted by the base station using the transmitting beam corresponding to the receiving beam is measured, as channel qualities for a plurality of transmitting beams included in the plurality of beam pairs. Herein, as an example, the lower layer may be a L1 layer (a physical layer) and/or a L2 layer (a MAC layer and/or a RLC layer), that is, the L1/L2 layer, and accordingly, the upper layer described below may be the L3 layer (a RRC layer).

The UE may monitor the plurality of beam pairs configured for the UE. Specifically, when the base station transmits a reference signal to the UE by the transmitting beam of the beam pair, the UE may use the receiving beam in the beam pair corresponding to the transmitting beam to receive the reference signal, and measure a reception quality of the reference signal as a (downstream) channel quality for the transmitting beam. Thereby, the UE may measure to obtain the channel qualities for the plurality of transmitting beams included in the plurality of beam pairs.

The beam pairs monitored by the UE may be configured by high layer signaling, such as Radio Resource Control (RRC) signaling. In addition, when the UE monitors the first beam pair, the reference signal may be a channel state information reference signal (CSI-RS) for radio resource management (RRM) measurement, a CSI-RS for channel state information (CSI) measurement (including a L1-RSRP measurement), or a demodulation reference signal (DMRS) for a downlink control channel (PDCCH); when the UE monitors the second beam pair, the reference signal may be a sync-signal block (SS block), a sync-signal (SS), a demodulation reference signal (DMRS) for a physical broadcast channel (PBCH), or a channel state information reference signal (CSI-RS) for radio resource management (RRM) measurement. In a case where the reference signal is the sync-signal block or the sync-signal, or the CSI-RS for RRM measurement, a correspondence relationship (which may be referred to as a Quasi Co-location relationship) between the CSI-RSs and DMRSs of the PDCCHs transmitted to the UE may be configured by the high layer signaling (e.g., RRC signaling), such that it is possible to know which control channel (PDCCH)'s channel quality is obtained by monitoring the measurement of the reference signal according to the correspondence relationship.

Referring to FIG. 3 continually, in step S302, whether the channel qualities for the plurality of transmitting beams satisfy a first condition is determined.

In a first implementation, in case where the channel qualities for the transmitting beams for a certain ratio (denoted as P1) of the plurality of transmitting beams are lower than a first threshold (denoted as TH1) for a certain period (denoted as T1), the channel qualities for the plurality of transmitting beams are determined to satisfy the first condition. In this implementation, the plurality of transmitting beams comprise serving beams and candidate beams. In addition, the ratio P1 may be set flexibly as needed, for example, may be set as 70%, 90%, 100% or other suitable values. The period T1 may also be flexibly set as needed. In addition, the threshold TH1 may be flexibly set as needed, for example, may be set as $Q_{out}$, wherein a signal to interference plus noise ratio (SINR) in case where a block error rate (BLER) of the reference signal or the control channel is greater than a certain value (e.g., 10%) may be set to $Q_{out}$. In this implementation, the plurality of transmitting beams comprise the serving beams and the candidate beams.

In a second implementation, in case where a beam failure event occurs on the serving beam of the plurality of transmitting beams (in the L1/L2 layer) and the channel qualities of the candidate beams for a certain ratio (denoted as P2) in the candidate beams are lower than a certain threshold (denoted as TH2) for a certain period (denoted as T2), the channel qualities for the plurality of transmitting beams are determined to satisfy the first condition. P2, T2, and TH2 may be flexibly set as needed, and may be as same as or different from P1, T1, and TH1, respectively. For example, the threshold TH2 may be $Q_{out}$ as described above, or may be other values. In addition, P2 may be 100%, or may be 80% or other suitable value.

In this implementation, this beam failure event in the L1/L2 layer may be any event capable of reflecting unavailability of the serving beams, and may be appropriately defined according to actual situations of the radio communication system and/or a radio environment, or may be a pre-defined event, such as beam failure events as defined in the 3GPP standard. For example, in case where the channel qualities of the serving beams for a certain ratio (denoted as P3) in the plurality of transmitting beams are lower than a threshold TH3 for a period T3, it may be considered that the beam failure event occurs on the serving beams of the plurality of transmitting beams. P3, T3, and TH3 can be flexibly set as needed, and may be as same as or different from the aforementioned ratios, periods, and thresholds, respectively. For example, the threshold TH3 may be $Q_{out}$ as described above, or may be other values. In addition, P3 may be 100%, or 80% or other suitable values. As another example, in case where the channel quality for the serving beams is lower than a certain threshold for a certain period and the channel quality for the candidate beams is higher than a certain threshold for a certain period, it may be considered that the beam failure event occurs on the serving beams.

In a third implementation, in case where the beam failure event occurs on the transmitting beams changing to the serving beams during a certain period (denoted as T4), the channel qualities for the plurality of transmitting beams are determined to satisfy the first condition. Specifically, when the beam failure event (such as the beam failure event described above) occurs on the serving beam, the base station would switch one or more candidate beams to the serving beam. However, if the beam failure event still occurs on the switched serving beams, the base station would switch another one or more candidate beams to the serving beam. If the beam failure event occurs on all transmitting beams changing to the serving beams during the period T4, it means that the channel qualities for the beams currently available to the UE are poor, thus it may be determined that the channel qualities for the plurality of transmitting beams satisfy the first condition to perform subsequent operations. Alternatively, in case where the beam failure event occurs on the transmitting beams for a certain ratio (denoted as P4) in the plurality of transmitting beams during the period T4, it is determined that the channel qualities for the plurality of transmitting beams satisfy the first condition.

Continued to FIG. 3, in step S303, an Out-Of-Sync (OOS) indication information is transmitted to an upper layer in case where the channel qualities for the plurality of transmitting beams satisfy the first condition, such that the upper layer determines whether a radio link failure occurs according to the OOS indication information.

Specifically, in case where the channel qualities for the plurality of transmitting beams satisfy the first condition, it may be determined that the channel qualities for the transmitting beams available to the UE are poor, and therefore, an Out-Of-Sync indication indicating that the UE and the base station is out of synchronization may be transmitted to the upper layer, such that the upper layer is able to determine whether the radio link failure occurs according to the Out-Of-Sync indication information. As described above, the upper layer may be an L3 layer, and hereinafter, it will take the L3 layer as an example to make a description.

The UE periodically repeats the above steps S301 to S303, that is, periodically measures the quality for the reference signal in the L1/L2 layer, thereby determining the channel qualities for the plurality of transmitting beams, and transmits the Out-Of-Sync indication information is transmitted to the L3 layer in case where the channel quality satisfies the first condition.

On the other hand, the UE may determine whether the channel qualities for the plurality of transmitting beams satisfy a second condition in the L1/L2 layer, and transmit an In-Sync indication information to the L3 layer in case where the channel qualities for the plurality of transmitting beams satisfy the second condition. For example, in case where the channel qualities of the transmitting beams for a certain ratio (denoted as P5) in the plurality of transmitting beams are higher than a certain threshold (denoted as TH5) for a certain period (denoted as T5), the channel qualities for the plurality of transmitting beams are determined to satisfy the second condition. The P5, T5 and TH5 may be flexibly set as needed. For example, the threshold TH5 may be set as $Q_{in}$, wherein a signal to interference plus noise ratio (SINR) in case where the block error rate (BLER) of the reference signal or the control channel is lower than a certain value (e.g., 2%) may be set as $Q_{in}$. In addition, P5 may be 100%, or 80% or other suitable values. It can be seen that in case where the channel qualities for the plurality of transmitting beams satisfies the second condition, the channel qualities for the transmitting beam available to the UE are better, thus it may be determined that a synchronization is achieved between the UE and the base station, and therefore the In-Sync indication information may be transmitted to the L3 layer. The L3 layer also uses the In-Sync indication information to determine whether a radio link failure occurs. Similarly, the In-Sync indication information is transmitted to the L3 layer whenever the UE determines that the channel qualities for the plurality of transmitting beams satisfy the second condition in the L1/L2 layer. Alternatively, besides the condition that the channel qualities of the transmitting beams for the ratio P5 in the plurality of transmitting beams are higher than the threshold TH5 for the period T5, further conditions may be added, such that only in case where all of these conditions are satisfied, it is determined that the channel qualities for the transmitting beams satisfy the second condition. The additional condition may be, for example, the transmitting beam having the channel quality higher than the threshold TH5 is same as at least one of the previous serving beams in a case where the channel qualities of the transmitting beams for the ratio P5 in the plurality of transmitting beams are higher than the threshold TH5 for the period T5. The reason for adding this condition is in that, if the transmitting beams having the channel quality higher than the threshold TH5 are completely different from the previously used service beams, it means that the channel qualities for the beams available to the UE are still unstable, and it is likely out of synchronization, so it is not suitable to transmit the In-Sync indication information.

Figure 4:
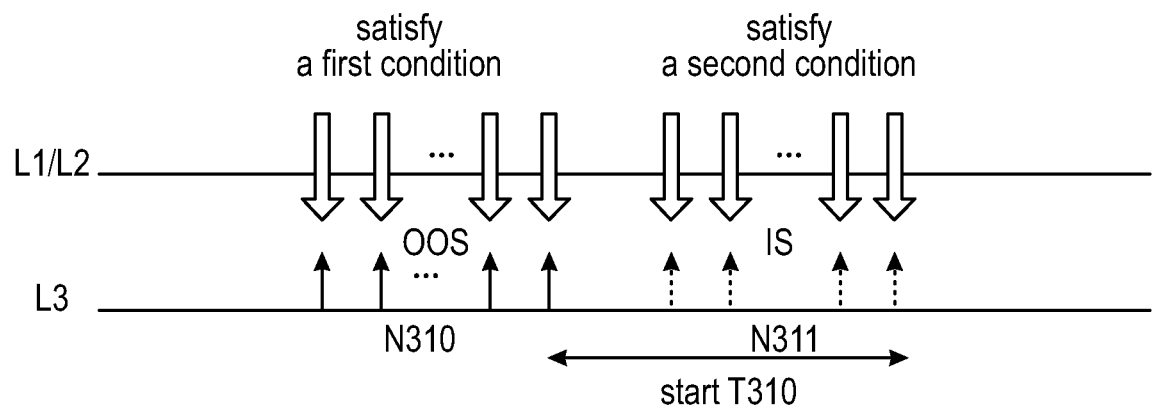
FIG. 4 is a schematic diagram of determining a radio link failure according to the first embodiment of the present disclosure.

Hereinafter, a detailed manner for determining a radio link failure in the L3 layer according to the first embodiment of the present disclosure will be described with reference to FIG. 4. Specifically, in step S303 as described above, when the Out-Of-Sync indication information is transmitted from the L1/L2 layer to the L3 layer, the L3 layer counts the Out-Of-Sync indication information. When the L3 layer consecutively receives N310 Out-Of-Sync indication information, the L3 layer starts a timer T310, and then counts the received In-Sync indication information. If the L3 layer consecutively receives N311 In-Sync indication information during the T310 is on, the L3 layer determines that no radio link failure occurs, and stops the timer T310. Otherwise, if the L3 layer does not consecutively receive N311 In-Sync indication information until the T310 expires, the L3 layer determines that the radio link failure occurs and starts to perform a RRC re-establishment process. The UE may perform the RRC re-establishment process in a manner well known in the art. For example, the UE may perform a RRM measurement based on the sync-signal and perform the RRC re-establishment by a random access process.

With the above method, in the multi-beam scenario, it may be convenient to detect the radio link failure. It should be understood that the methods described above are only illustrative rather than restrictive. For example, although various ratios are used as describing the above methods, the ratios may be replaced by quantities. For example, in step S302, it may be determined that the channel qualities for the plurality of transmitting beams satisfy the first condition or the second condition in case where a predetermined number of transmitting beams satisfy various requirements. In addition, for example, it may be determined that the channel qualities for the plurality of transmitting beams satisfy the second condition in case where the channel qualities for a certain number (e.g., 1) of the plurality of transmitting beams are higher than the threshold TH5 for the period T5.

In addition, as described above, the UE may be configured with a plurality of first beam pairs and a plurality of second beam pairs, such that the UE is configured with the transmitting beams with the first type and the transmitting beams with the second type. In this case, when measuring the channel quality for the plurality of transmitting beams, the transmitting beams with the first type and the transmitting beams with the second type are not need to be distinguished, that is, the channel quality for the transmitting beams including the first type and the second type may be measured, and subsequent operations are performed according to the channel quality.

Hereinafter, a UE according to a first embodiment of the present invention will be described with reference to FIG. 5. The UE is configured with a plurality of beam pairs, each beam pair includes one transmitting beam used by the base station to transmit signals and one corresponding receiving beam used by the user equipment to receive the signals. The beams of the beam pair may include only the beams with the first type, only the beams with the second type, or may include the beams both with the first type and the second type. Since operations of the user equipment is substantially the same as the details of the corresponding steps of the method described with reference to FIG. 3, the descriptions for the same contents are omitted here.

Figure 5:
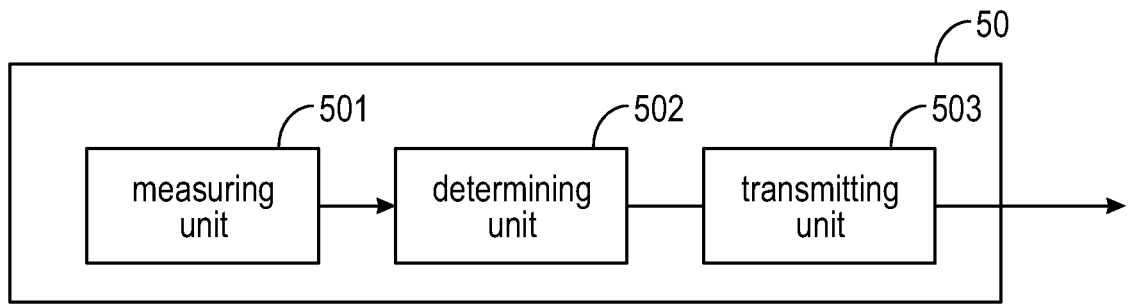
FIG. 5 is a block diagram of a UE according to the first embodiment of the present invention.

As shown in FIG. 5, the UE 50 includes a measuring unit 501, a determining unit 502, and a transmitting unit 503.

The measuring unit 501 measures, in the lower layer (e.g., the L1/L2 layer), the quality of the reference signal received with the receiving beam of each beam pair and transmitted by the base station using the transmitting beam corresponding to the receiving beam, as the channel qualities for the plurality of transmitting beams included in the plurality of beam pairs. As described above, the beam pairs monitored by the UE may be configured by the high layer signaling (e.g., the RRC signaling). In addition, when the UE monitors the first beam pair, the reference signal may be the CSI-RS for the RRM measurement, the CSI-RS for the CSI measurement, or the DMRS for the PDCCH; when the UE monitors the second beam pairs, the reference signal may be the sync-signal (SS), the DMRS for the PBCH, or the CSI-RS for the RRM measurement. In the case that the reference signal is the sync-signal, or the CSI-RS for the RRM measurement, the correspondence relationship (the Quasi Co-location relationship) between the CSI-RS and DMRSs of the PDCCHs transmitted to the UE may be configured by the high layer signaling (e.g., the RRC signaling), such that it is possible to know which control channel (PDCCH)'s channel quality is obtained by monitoring the measurement of the reference signal according to the correspondence relationship.

The determining unit 502 may determine whether the channel qualities for the plurality of transmitting beams satisfy the first condition.

In a first implementation, in case where the channel qualities of the transmitting beams for the ratio P1 in the plurality of transmitting beams are lower than the threshold TH1 for the period T1, the determining unit 502 may determine that the channel qualities for the plurality of transmitting beams satisfy the first condition. In this implementation, the plurality of transmitting beams comprise the serving beams and the candidate beams. In addition, the ratio P1 and the period T1 may also be flexibly set as needed. In addition, the threshold TH1 may be flexibly set as needed, for example, may be set as $Q_{out}$. In this implementation, the plurality of transmitting beams comprise the serving beams and the candidate beams.

In a second implementation, in case where the unavailability occurs on the serving beams of the plurality of transmitting beams and the channel qualities of the candidate beams for the ratio P2 in the candidate beams are lower than the threshold TH2 for the period T2, the channel qualities for the plurality of transmitting beams are determined to satisfy the first condition. P2, T2, and TH2 may be flexibly set as needed, and may be the same or different from P1, T1, and TH1, respectively. For example, the threshold TH2 may be $Q_{out}$ as described above, or may be other values. In this implementation, as described above, such a beam failure event in the L1/L2 layer may be any event capable of reflecting the unavailability of the serving beams, and may be appropriately defined according to the actual situation of the radio communication system and/or the radio environment, or may be pre-defined events, such as the beam failure events as defined in the 3GPP standard. For example, in case where the channel qualities of the serving beams for the ratio P3 in the plurality of transmitting beams are lower than the threshold TH3 for the period T3, it may consider that the beam failure event occurs on the serving beams of the plurality of transmitting beams. The P3, T3, and TH3 can be flexibly set as needed. For example, the threshold TH3 may be $Q_{out}$ as described above, or may be other values. As another example, in case where the channel quality for the serving beam is lower than a certain threshold for a certain period, and the channel quality for the candidate beam is higher than a certain threshold for a certain period, it may consider that the beam failure event occurs on the serving beam.

In a third implementation, in case where the beam failure event occurs on the transmitting beams changing to the serving beams during the period T4, the determining unit 502 may determine that the channel quality for the plurality of transmitting beams satisfy the first condition. Alternatively, in case where the beam failure event occurs on the transmitting beams for the ratio P4 of the transmitting beams during the period T4, the determining unit 502 may determine that the channel qualities for the plurality of transmitting beams satisfy the first condition.

The transmitting unit 503 may transmit the Out-Of-Sync indication information to the upper layer in case where the determining unit 502 determines that the channel qualities for the plurality of transmitting beams satisfy the first condition, such that the upper layer determines whether the radio link failure occurs according to the OOS indication information.

The respective units of the UE 50 periodically repeat the above operations, that is, periodically measure the quality for the reference signal in the L1/L2 layer, thereby determining the channel qualities for the plurality of transmitting beams, and in case where the channel qualities satisfy the first condition, the Out-Of-Sync indication information is transmitted to the L3 layer.

On the other hand, the determining unit 502 may determine whether the channel qualities for the plurality of transmitting beams satisfy the second condition in the L1/L2 layer, and the transmitting unit 503 transmits the In-Sync indication to the L3 layer in case where the determining unit 502 determines that the channel qualities for the plurality of transmitting beams satisfy the second condition. For example, in case where the channel qualities of the transmitting beams for the ratio P5 in the plurality of transmitting beams are higher than a certain threshold TH5 for a certain period T5, the channel qualities for the plurality of transmitting beams is determined to satisfy the second condition. The P5, T5 and TH5 may be flexibly set as needed. For example, the threshold TH5 may be set as $Q_{in}$.

Then, the UE may determine whether the radio link failure occurs in the L3 layer according to the Out-Of-Sync indication information and/or the In-Sync indication information according to the method described above with reference to FIG. 4. Herein, similar descriptions are omitted for the sake of simplicity.

Hereinafter, a method for detecting a radio link failure according to a second embodiment of the present disclosure will be described. In this embodiment, the UE is configured with a plurality of first beam pairs and a plurality of second beam pairs, that is, the UE is configured with a plurality of transmitting beams with a first type (fine transmitting beams) and a plurality of transmitting beams with a second type (rough transmitting beams).

Figure 6:
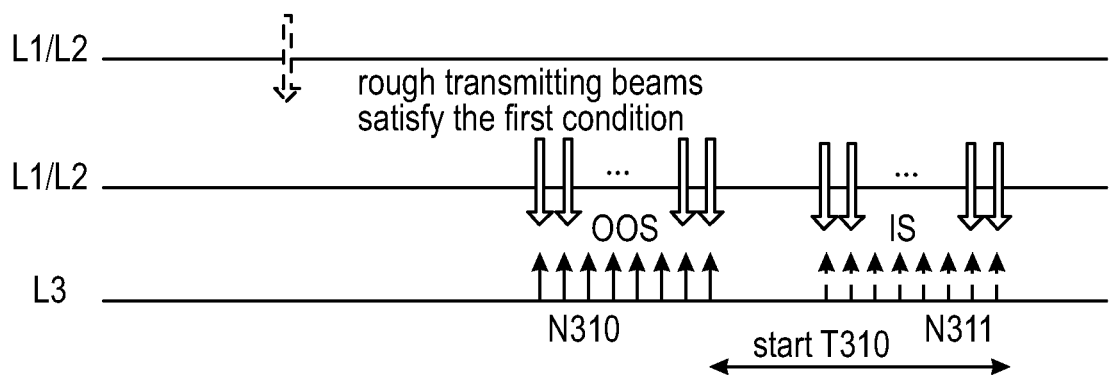
FIG. 6 is a schematic diagram of determining the radio link failure according to a second embodiment of the present disclosure.

As shown in FIG. 6, the method for detecting the radio link failure according to the second embodiment of the present disclosure is different from the method for detecting the radio link failure according to the first embodiment of the present disclosure lie in that, when it is detected that the beam failure event occurs on the fine transmitting beams in the L1/L2 layer, or when it is detected that the channel qualities for the fine transmitting beams satisfy the first condition in the L1/L2 layer, the UE performs a fallback to detect the radio link failure according to the rough transmit beams.

Figure 7:
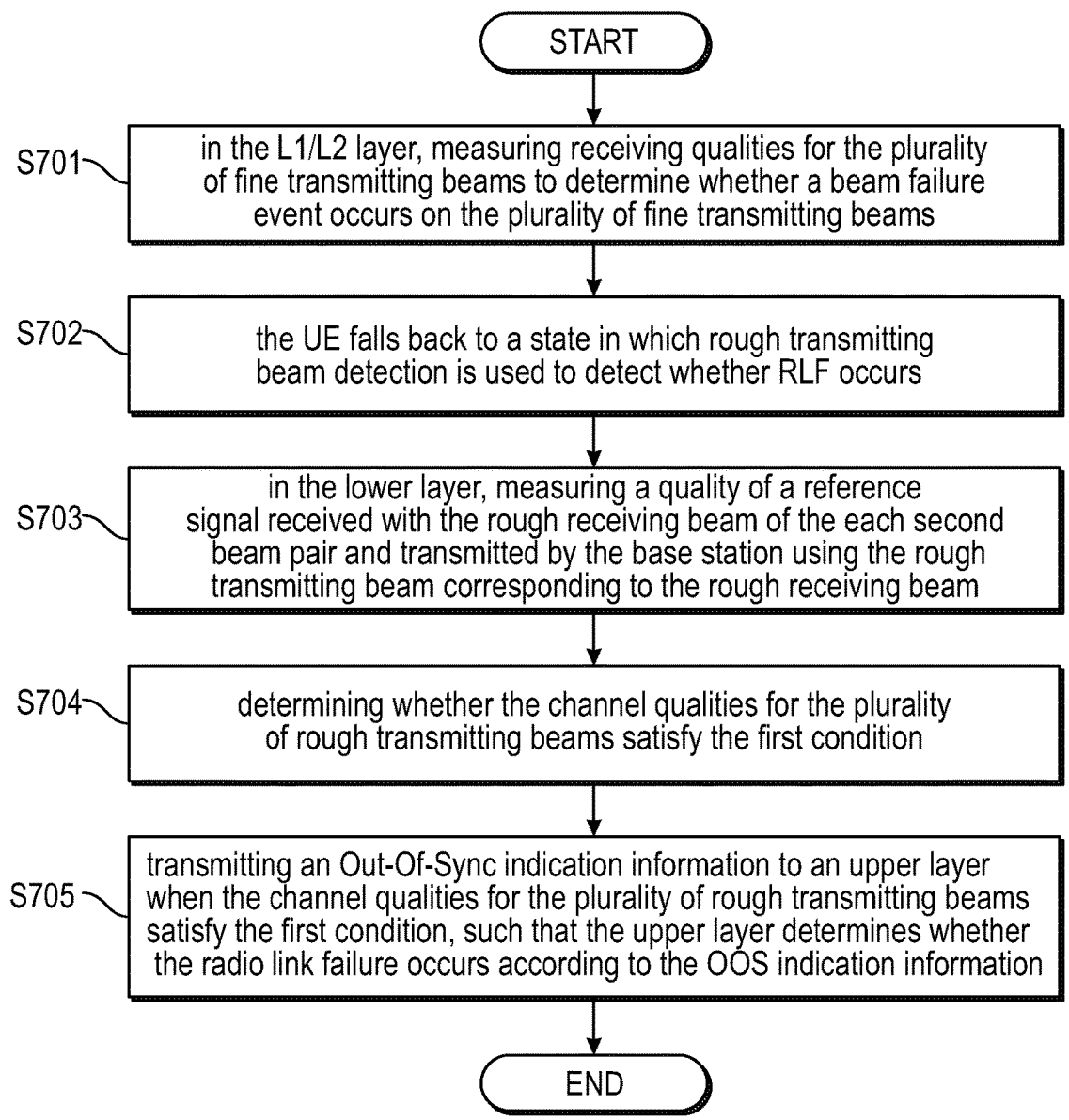
FIG. 7 is a flowchart of a method for detecting the radio link failure according to the second embodiment of the present disclosure.

Specifically, referring to FIG. 7, in step S701, in the L1/L2 layer, channel qualities for the plurality of fine transmitting beams are measured, and whether the beam failure event occurs on the plurality of fine transmitting beams are determined. Specifically, a quality of a reference signal received with the fine receiving beam of each first beam pair and transmitted by the base station using the fine transmitting beam corresponding to the fine receiving beam may be measured, as the channel qualities for the plurality of fine transmitting beams. Then, whether the beam failure event occurs on the plurality of fine transmitting beams is determined according to channel qualities for the plurality of fine transmitting beams. As described above, the beam failure event in the L1/L2 layer may be an event appropriately defined according to the actual situation of the radio communication system and/or the radio environment. For example, in case where channel qualities of the fine transmitting beams for a certain ratio in the plurality of fine transmitting beams are lower than a threshold for a certain period, it may consider that the beam failure event occurs on the plurality of fine transmitting beams, wherein the ratio, period and threshold may be flexibly set as needed. Alternatively, in this step, it may measure the channel qualities for the plurality of fine transmitting beams in the L1/L2 layer, and determine whether the channel qualities for the plurality of fine transmitting beams satisfy the first condition.

If it is determined in step S701 that the beam failure event occurs on the plurality of fine transmitting beams (i.e., after determining that the beam failure event occurs on the plurality of fine transmitting beams in the L1/L2 layer), or determined that the channel qualities for the plurality of fine transmitting beams satisfy the first condition, then in step S702, the UE falls back to a state in which a rough transmitting beam detection is used to detect whether the RLF occurs.

Next, in step S703, a quality of a reference signal received with the rough receiving beam of each second beam pair and transmitted by the base station using the rough transmitting beam corresponding to the rough receiving beam in the L1/L2 layer is determined, as channel qualities for a plurality of rough transmitting beams included in the plurality of second beam pairs. In a second embodiment, the reference signal may be the sync-signal (SS), the DMRS for the PBCH, or the CSI-RS for the RRM measurement. In the case that the reference signal is the sync-signal, or the CSI-RS for the RRM measurement, the correspondence relationship (the Quasi Co-location relationship) between the CSI-RS and the DMRSs of the PDCCH transmitted to the UE may be configured by the high layer signaling (e.g., the RRC signaling), such that it is possible to know which control channel (PDCCH)'s channel quality is obtained by monitoring the measurement of the reference signal according to the correspondence relationship.

Continued to FIG. 7, in step S704, whether the channel qualities for the plurality of transmitting beams satisfy the first condition is determined. In step S705, the Out-Of-Sync indication information is transmitted to the upper layer in case where the channel qualities for the plurality of transmitting beams satisfy the first condition, such that the upper layer determines whether the radio link failure occurs according to the OOS indication information. Steps S703 to S705 in the method according to the second embodiment of the present disclosure are the same as steps S301 to S303 in the method according to the first embodiment of the present disclosure, except that objects to be directed are limited to the rough beams, and descriptions of the same contents are omitted here for the sake of simplicity.

In addition, the UE may determine whether the channel qualities for the plurality of transmitting beams satisfy the second condition in the L1/L2 layer, and transmit the In-Sync indication information to the L3 layer in case where the channel qualities for the plurality of transmitting beams satisfy the second condition.

Then, the UE may determine whether the radio link failure occurs according to the Out-Of-Sync indication information and the In-Sync indication information in the manner described above with respect to FIG. 4.

Next, a UE according to a second embodiment of the present disclosure will be described with reference to FIG. 8. The UE is configured with a plurality of first beam pairs and a plurality of second beam pairs, that is, the UE is configured with a plurality of transmitting beams with a first type (fine transmitting beams) and a plurality of transmitting beams with a second type (rough transmission Beam). In addition, the details of the operations performed by the UE are the same as the respective steps of the method described above with reference to FIG. 6, and thus the descriptions of the same contents are omitted here.

Figure 8:
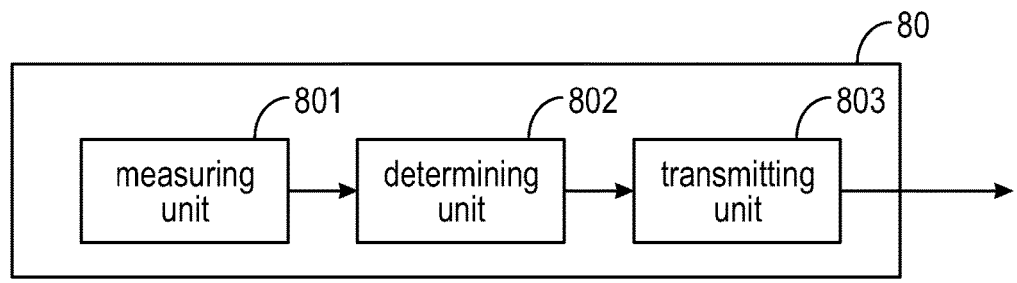
FIG. 8 is a block diagram of a UE according to the second embodiment of the present invention.

As shown in FIG. 8, the UE 80 includes a measuring unit 801, a determining unit 802, and a transmitting unit 803.

The measuring unit 801, in the L1/L2 layer, measures channel qualities for the plurality of fine transmitting beams, and the determining unit 802 determines whether the beam failure event occurs on the plurality of fine transmitting beams. Specifically, the measuring unit 801 may measure a quality of a reference signal received with the fine receiving beam of each first beam pair and transmitted by the base station using the fine transmitting beam corresponding to the fine receiving beam, as the channel qualities for the plurality of fine transmitting beams. Then, the determining unit 802 determines whether the beam failure event occurs on the plurality of fine transmitting beams according to the channel qualities for the plurality of fine transmitting beams. Alternatively, the determining unit 802 may determine whether the channel qualities for the plurality of fine transmitting beams satisfy the first condition.

If the determining unit 802 determines that the beam failure event occurs on the plurality of fine transmitting beams (i.e., after determining that the beam failure event occurs on the plurality of fine transmitting beams in the L1/L2 layer), or determines that the channel qualities for the plurality of fine transmitting beams satisfy the first condition, then the UE falls back to a state in which a rough transmitting beam detection is used to detect whether the RLF occurs.

Then, the measuring unit 801 measures, in the L1/L2 layer, a quality of a reference signal received with the rough receiving beam of each second beam pair and transmitted by the base station using the rough transmitting beam corresponding to the rough receiving beam, as the channel qualities for the plurality of rough transmitting beams included in the plurality of second beam pairs. Then, the determining unit 802 determines whether the channel qualities for the plurality of transmitting beams satisfy the first condition. The transmitting unit 803 transmits the Out-Of-Sync indication information to the upper layer in case where the channel qualities for the plurality of transmitting beams satisfy the first condition.

In addition, the determining unit 802 may determine if the channel qualities for the plurality of transmitting beams satisfy the second condition in the L1/L2 layer, and in case where the determining unit 802 determines that the channel qualities for the plurality of transmitting beams satisfy the second condition, the transmitting unit 803 may transmit the In-Sync indication information to the L3 layer.

Then, the UE may determine whether the radio link failure occurs based on the Out-Of-Sync indication information and the In-Sync indication information in the manner described above with reference to FIG. 4.

Next, a method for detecting a radio link failure according to a third embodiment of the present disclosure will be described with reference to FIG. 9. In this embodiment, the UE is configured with a plurality of first beam pairs and a plurality of second beam pairs, that is, the UE is configured with a plurality of first type of transmitting beams (fine transmitting beams) and a plurality of second types. Transmit beam (rough transmitting beam).

Figure 9:
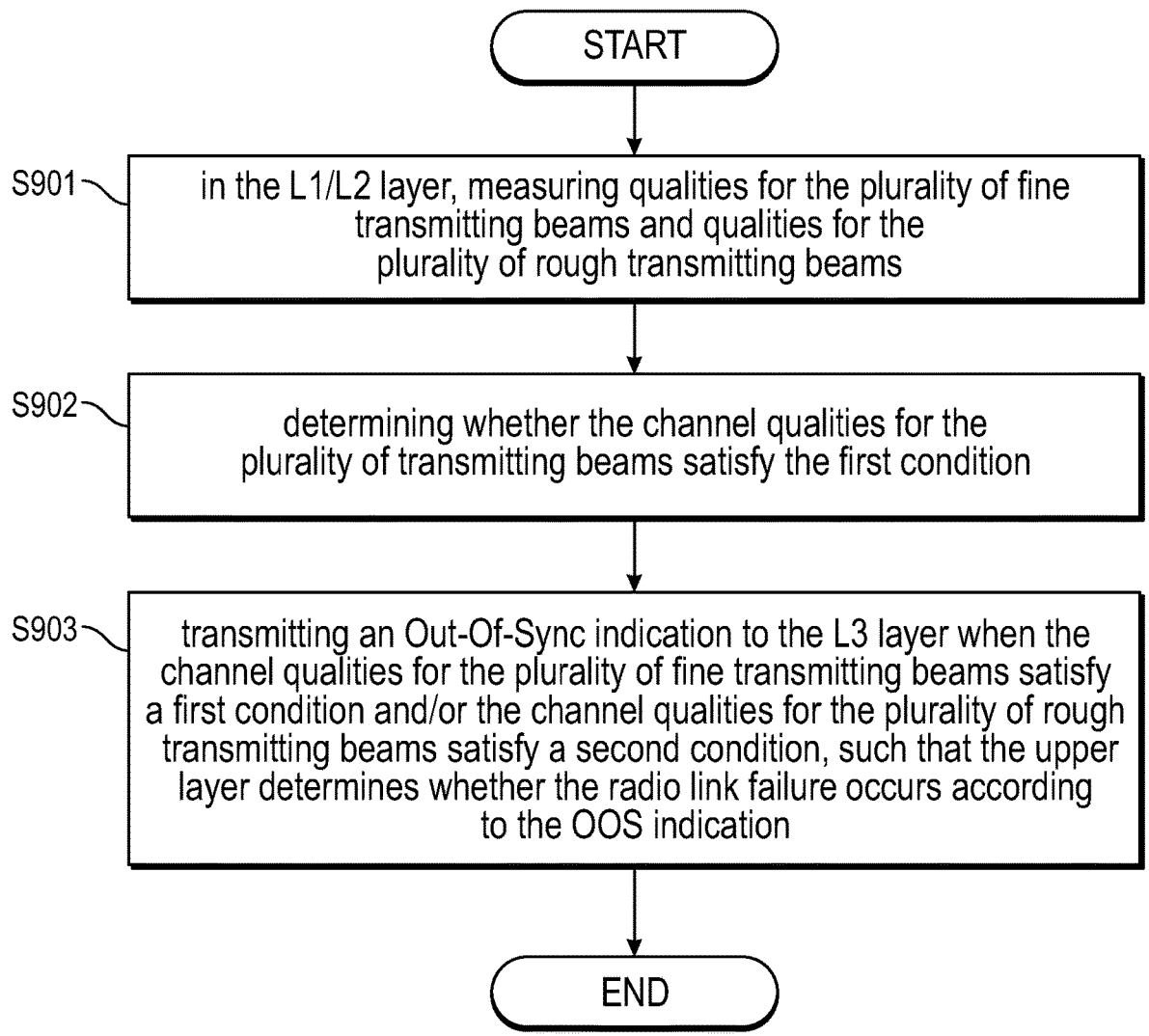
FIG. 9 is a flowchart of a method for detecting the radio link failure according to a third embodiment of the present disclosure.

As shown in FIG. 9, in step S901, in the L1/L2 layer, a quality of a reference signal received with a fine receiving beam of each first beam pair and transmitted by the base station using a fine transmitting beam corresponding to the fine receiving beam is measured, as channel qualities for the plurality of fine transmitting beams, and a quality of a reference signal received with a rough receiving beam of each second beam pair and transmitted by the base station using a rough transmitting beam corresponding to the rough receiving beam is measured, as channel qualities for the plurality of rough transmitting beams. Herein, the measurement steps described above are substantially the same as the measurement steps described with reference to FIG. 3, except that the beams to which the measurement is directed may be different, and details are not repeated herein again.

In step S902, whether the channel qualities for the plurality of fine transmitting beams satisfy the first condition is determined, and whether the channel qualities for the plurality of rough transmitting beams satisfy the second condition is determined. Herein, the determining step is substantially the same as the determining step described with reference to FIG. 3, except that the beams to be directed may be different, and details are not repeated herein again. In addition, the first condition and the second condition may differ only in one or more of the respective periods, thresholds, and ratios, and the remaining contents are same. In step S903, in case where the channel qualities for the plurality of fine transmitting beams satisfy the first condition, and/or the channel qualities for the plurality of rough transmitting beams satisfy the second condition, the Out-Of-Sync indication information is transmitted to the L3 layer, such that the upper layer determines whether the radio link failure occurs according to the Out-Of-Sync indication information.

Herein, a condition(s) for transmitting the Out-Of-Sync indication information to the L3 layer may be set as needed. For example, it may be set such that the Out-Of-Sync indication information is transmitted to the L3 layer only in case where the channel qualities for the plurality of fine transmitting beams satisfy the first condition, or the Out-Of-Sync indication information is transmitted to the L3 layer only in case where the channel qualities for the plurality of fine transmitting beams with the second type satisfy the second condition, or the Out-Of-Sync indication information is transmitted to the L3 layer in case where the channel qualities for the plurality of fine transmitting beams satisfy the first condition and the channel qualities for the plurality of rough transmitting beams satisfy the second condition.

Also, in the method, the UE may determine, in the L1/L2 layer, whether the channel qualities for the plurality of fine transmitting beams satisfy the second condition, and whether the channel qualities for the plurality of rough transmitting beams satisfy the second condition, and transmits the In-Sync indication information is transmitted to the L3 layer in case where the channel qualities for the plurality of fine transmitting beams satisfy the second condition, and/or the channel qualities for the plurality of rough transmitting beams satisfy the second condition.

Then, the UE may determine whether the radio link failure occurs based on the Out-Of-Sync indication information and the In-Sync indication information in the manner described above with reference to FIG. 4.

Hereinafter, a UE according to a third embodiment of the present disclosure will be described with reference to FIG. 10. In this embodiment, the UE is configured with a plurality of first beam pairs and a plurality of second beam pairs, that is, the UE is configured with a plurality of transmitting beams with a first type (fine transmitting beams) and a plurality of transmitting beams with a second type (rough transmitting beams). Since the operation details of the UE are the same as those described above with reference to FIG. 9, the descriptions of the same contents is omitted here.

Figure 10:
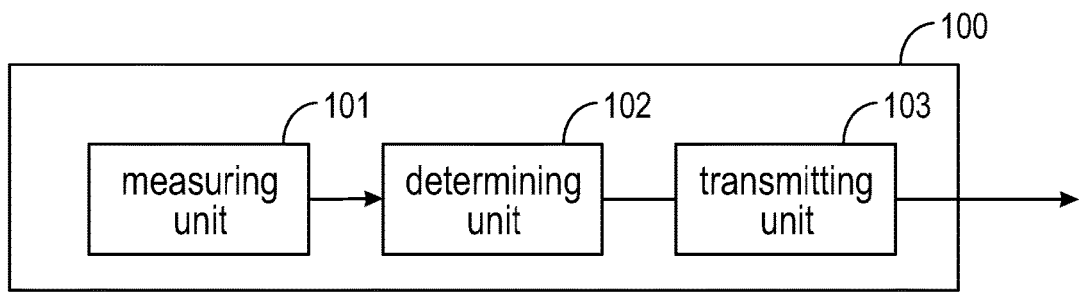
FIG. 10 is a block diagram of a UE according to the third embodiment of the present invention.

As shown in FIG. 10, the UE 100 includes a measuring unit 101, a determining unit 102, and a transmitting unit 103.

The measuring unit 101, in the L1/L2 layer, measures a quality of a reference signal received with a fine receiving beam of each first beam pair and transmitted by the base station using a fine transmitting beam corresponding to the fine receiving beam, as channel qualities for the plurality of fine transmitting beams, and measures a quality of a reference signal received with a rough receiving beam of each second beam pair and transmitted by the base station using a rough transmitting beam corresponding to the rough receiving beams, as channel qualities for the plurality of rough transmitting beams.

The determining unit 102 determines whether the channel qualities for the plurality of fine transmitting beams satisfy the first condition, and determines whether the channel qualities for the plurality of rough transmitting beams satisfy the second condition. The first condition and the second condition may differ only in one or more of corresponding periods, thresholds, and ratios, and the remaining contents are the same.

The transmitting unit 103 may transmit the Out-Of-Sync indication information to the L3 layer in case where the channel qualities for the plurality of fine transmitting beams satisfy the first condition, and/or the channel qualities for the plurality of rough transmitting beams satisfy the second condition, such that the upper layer determines whether the radio link failure occurs according to the Out-Of-Sync indication information.

In addition, the determining unit 102 may further determine, in the L1/L2 layer, whether the channel qualities for the plurality of fine transmitting beams satisfy the second condition, and whether the channel qualities for the plurality of rough transmitting beams satisfy the second condition. In case where the determining unit 102 determines that the channel qualities for the plurality of fine transmitting beams satisfy the second condition, and/or the channel qualities for the plurality of rough transmitting beams satisfy the second condition, the transmitting unit 103 may transmit the In-Sync indication information to the L3 layer.

Then, the UE may determine whether the radio link failure occurs based on the Out-Of-Sync indication information and the In-Sync indication information in the manner described above with reference to FIG. 4.

Next, a method for detecting a radio link failure according to a fourth embodiment of the present disclosure will be described with reference to FIG. 11. In this embodiment, the UE is configured with a plurality of first beam pairs and a plurality of second beam pairs, that is, the UE is configured with a plurality of transmitting beams with a first type (fine transmitting beams) and a plurality of transmitting beams with a second type (rough transmitting beams).

Figure 11:
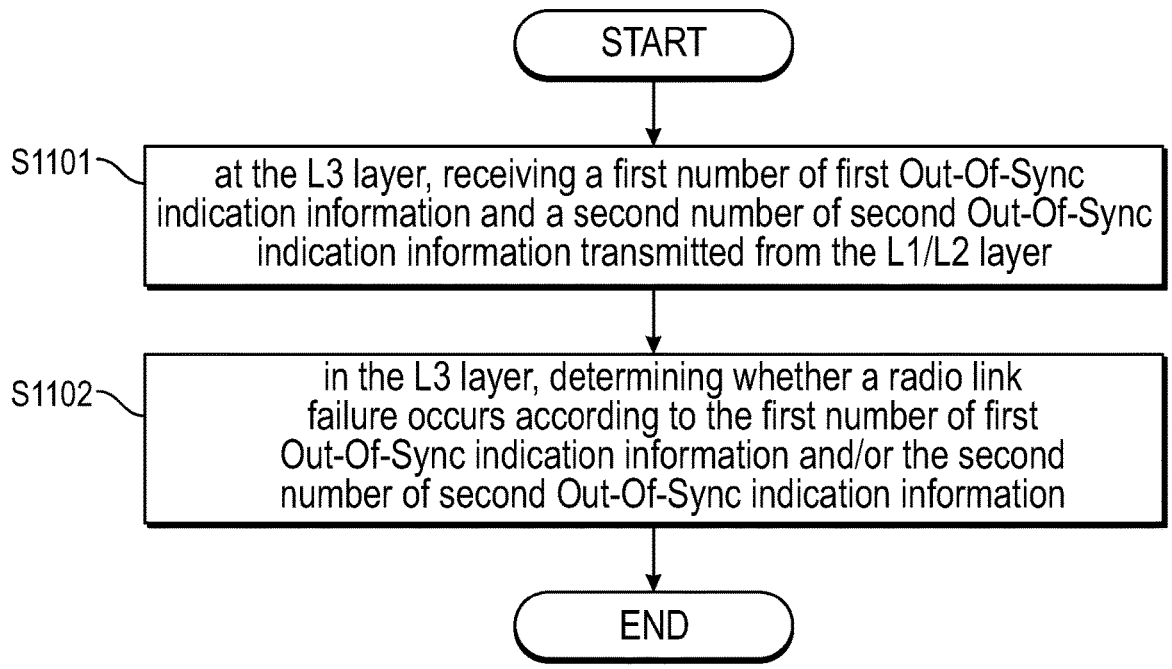
FIG. 11 is a flowchart of a method for detecting the radio link failure according to a fourth embodiment of the present disclosure.

As shown in FIG. 11, in step S1101, a consecutive first number of first Out-Of-Sync indication information and a consecutive second number of second Out-Of-Sync indication information transmitted from the L1/L2 layer are received at the L3 layer. The first Out-Of-Sync indication information is transmitted when the channel qualities for the plurality of fine transmitting beams, obtained by measuring a quality of a reference signal received with a fine receiving beam of each first beam pair and transmitted by the base station using a fine transmitting beam corresponding to the fine receiving beam, satisfy the first condition. The second Out-Of-Sync indication information is transmitted in case where the channel qualities for the plurality of rough transmitting beams, obtained by measuring a quality of a reference signal received with a rough receiving beam of each second beam pair and transmitted by the base station using a rough transmitting beam corresponding to the rough receiving beam, satisfy the second condition. For example, it may determine whether the channel qualities for the plurality of fine transmitting beams satisfy the first condition and whether the channel qualities for the plurality of rough transmitting beams satisfy the second condition in the manner described above with reference to FIG. 3, and transmit the first Out-Of-Sync indication information in case where the channel qualities for the plurality of fine transmitting beams satisfy the first condition, and transmit the second Out-Of-Sync indication information in case where the channel qualities for the plurality of rough transmitting beams satisfy the second condition. It should be noted that the first condition and the second condition may be the same or different, and the first number and the second number may be same or different.

In step S1102, in the L3 layer, whether the radio link failure occurs is determined according to the first number of first Out-Of-Sync indication information and/or the second number of second Out-Of-Sync indication information.

Specifically, it may be determined whether to start a timer T310 only according to the first number of the first Out-Of-Sync indication information, and in this case, the timer T310 may be started when the first number reaches $N310_1$ set for the fine beam. Alternatively, it may be determined whether to start the timer T310 only according to the second number of the second Out-Of-Sync indication information, and in this case, the timer T310 may be started when the second number reaches $N310_2$ set for the rough beam. Alternatively, it may be determined whether to start the timer T310 according to both the first number of the first Out-Of-Sync indication information and the second number of the second Out-Of-Sync indication information. In this case, the timer T310 may be started when the first number reaches the $N310_1$ set for the fine beam and the second number reaches the $N310_2$ set for the rough beam for a certain period. Herein, $N310_1$ and $N310_2$ may be same or different.

After the timer T310 is started, a consecutive third number of first In-Sync indication information and/or a consecutive fourth number of second In-Sync indication information transmitted from the L1/L2 layer may be further received at the L3 layer. The first In-Sync indication information is transmitted in case where the channel qualities for the plurality of fine of transmitting beams satisfy the first condition, and second In-Sync indication information is transmitted in case where the channel qualities for the plurality of rough transmitting beams satisfy the second condition. Then, it may be determined whether to stop the timer T310 according to the third number of first In-Sync indication information and/or the fourth number of second In-Sync indication information. For example, it may be determined whether to stop the timer T310 only according to the third number of first In-Sync indication information, and in this case, the timer T310 may be stopped when the third number reaches $N311_1$ set for the fine beam. Alternatively, it may be determined whether to stop the timer T310 only according to the fourth number of second In-Sync indication information, and in this case, the timer T310 may be stopped when the fourth number reaches $N311_2$ set for the rough beam. Alternatively, it may be determined whether to stop the timer T310 according to both of the third number of the first In-Sync indication information and the fourth number of the second In-Sync indication information, and in this case, the timer T310 may be stopped when the third number reaches $N311_1$ set for the fine beam and the fourth number reaches $N311_2$ set for the rough beam during a certain period.

Thereby, the UE can determine whether the radio link failure occurs.

Next, a UE according to a fourth embodiment of the present disclosure will be described with reference to FIG. 12. In this embodiment, the UE is configured with a plurality of first beam pairs and a plurality of second beam pairs, that is, the UE is configured with a plurality of transmitting beams with a first type (fine transmitting beams) and a plurality of transmitting beams with a second type (rough transmitting beams). Since the operation details of the UE are the same as those described above with reference to FIG. 11, the descriptions of the same contents are omitted here.

Figure 12:
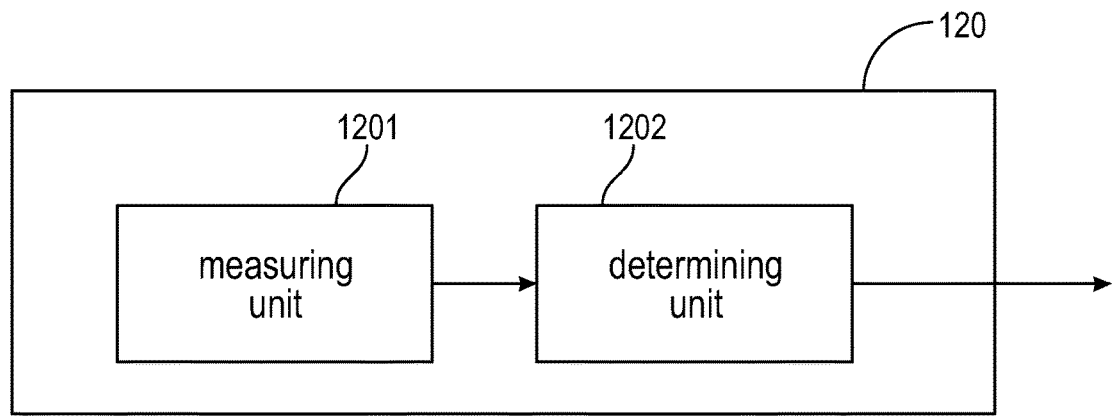
FIG. 12 is a block diagram of a UE according to the fourth embodiment of the present disclosure.

As shown in FIG. 12, the UE 120 includes a receiving unit 1001 and a determining unit 1002.

The receiving unit 1001 receives, at the L3 layer, the consecutive first number of first Out-Of-Sync indication information and the consecutive second number of second Out-Of-Sync indication information transmitted from the L1/L2 layer.

The determining unit 1002, in the L3 layer, determines whether the radio link failure occurs according to the first number of first Out-Of-Sync indication information and/or the second number of second Out-Of-Sync indication information. Specifically, it may be determined whether to start the timer T310 only according to the first number of first Out-Of-Sync indication information, or it may be determined whether to start the timer T310 only according to the second number of second Out-Of-Sync indication information, or it may be determined whether to start the timer T310 according to both the first number of the first Out-Of-Sync indication information and the second number of the second Out-Of-Sync indication information.

After the timer T310 is started, the receiving unit 1001 may further receive, at the L3 layer, the third number of first In-Sync indication information and/or the fourth number of second In-Sync indication information transmitted from the L1/L2 layer. Then, the determining unit 1002 may determine whether to stop the timer T310 according to the third number of first In-Sync indication information and/or the fourth number of second In-Sync indication information. For example, the determining unit 1002 may determine whether to stop the timer T310 only according to the third number of first In-Sync indication information, or determine whether to stop the timer T310 only according to the fourth number of second In-Sync indication information, or determine whether to stop the timer T310 according to the third number of the first In-Sync indication information and the fourth number of the second In-Sync indication information, and in this case, the timer T310 may be stopped when the third number reaches $N311_1$ set for the fine beam and the fourth number reaches $N311_2$ set for the rough beam.

Thus, in the multi-beam scenario, the UE may determine whether the radio link failure occurs.

In the above descriptions, the method for detecting the radio link failure and the corresponding mobile station according to embodiments of the present disclosure are described. It should be understood that the examples are only illustrative rather than restrictive. For example, although in the various embodiments described above, the count values N310 and N311 and the timer T311 are used to determine whether the radio link failure occurs, in some embodiments, modifications may be made thereto. For example, N310 may be omitted such that the timer T310 may be started whenever the Out-Of-Sync indication information is received. Alternatively, T310 and N311 may be omitted such that the occurrence of the radio link failure may be determined when N310 Out-Of-Sync indication information is consecutively received. Alternatively, these three parameters may be omitted such that the occurrence of the radio link failure may be determined as long as the Out-Of-Sync indication information is received.

It can be seen that, it is possible to detect the radio link failure conveniently in the multi-beam scenario with the above method and corresponding mobile station according to embodiments of the present disclosure.

The block diagrams used in the description of the above embodiments show blocks in units of functions. These functional blocks (structural units) may be implemented in arbitrary combination of hardware and/or software. Also, means for implementing the each functional block is not particularly limited. That is, the respective functional blocks may be implemented by one apparatus that is physically and/or logically jointed; or more than two apparatuses that are physically and/or logically separated may be directly and/or indirectly (e.g., wirely and/or wirelessly) connected, and the respective functional blocks may be implemented by these apparatuses.

Figure 13:
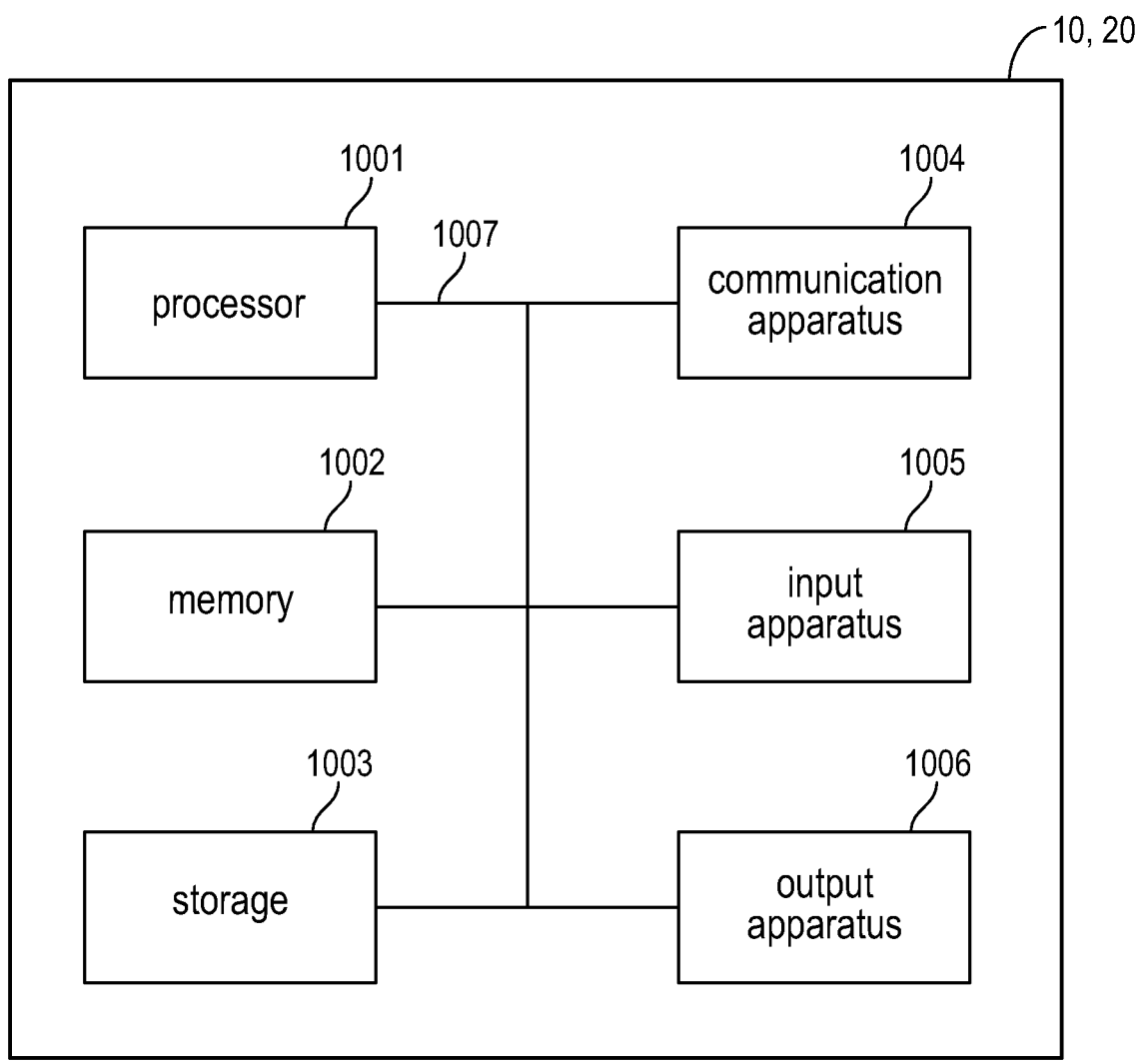
FIG. 13 is a diagram showing an example of a hardware configuration of a wireless base station and a user terminal according to the present disclosure.

For example, the wireless base station, the user equipment (or user terminal) and so on according to the embodiments of the present invention may function as computers that execute the processes of the wireless communication methods of the present invention. FIG. 13 is a diagram of an example showing hardware constitution of a wireless base station and a user terminal according to an embodiment of the present invention. The above wireless base station 10 and the user terminal 20 may be physically constituted as computer apparatus comprising a processor 1001, a memory 1002, a storage 1003, a communication apparatus 1004, an input apparatus 1005, an output apparatus 1006, a bus 1007, and so on.

In addition, in the above description, the term "apparatus" may be interpreted as a circuit, a device, a unit or the like. The hardware constitution of the wireless base station 10 and the user terminal 20 may be constituted to include one or more apparatuses shown in the figure, or may be constituted without including a part of the apparatuses.

For example, only one processor is illustrated, but there may be a plurality of processors. For example, the processes may be performed by one processor, or may be performed by more than one processors, simultaneously or subsequentially, or in any other manners. Furthermore, the processor 1001 may be installed by more than one chips.

Respective functions of the wireless base station 10 and the user terminal 20 are implemented by reading designated software (program) on hardware such as the processer 1001 and the memory 1002, by computation performed by the processor 1001, by the communication performed by controlling the communication apparatus 1004, and by reading and/or writing of data in the memory 1002 and the storage 1003.

The processor 1001, for example, operates an operating system to control the entire computer. The processor 1001 may be constituted by a central processing apparatus (CPU: central processing unit), which includes interfaces with peripheral apparatus, control apparatus, computing apparatus, a register, etc. For example, the respective encoders above may be implemented by the processor 1001.

In addition, the processor 1001 reads programs (program codes), software modules and data from the storage 1003 and/or the communication apparatus 1004 to the memory 1002, and execute various processing in accordance with contents thereof. As a program, a program causing the computers to execute at least a part of the operations described in the above embodiments is used. The above various processing is described for purpose of being executed in one processer 1001, but also may be performed simultaneously or sequentially by more than two processers 1001. The processer 1001 may be implemented with more than one chips. It should be noted that the program may be transmitted from a network via a communication circuit.

The memory 1002 is a computer-readable recording medium, and may be constituted, for example, by at least one of a ROM (a Read Only Memory), an EPROM (Erasable Programmable ROM), an EEPROM (Electrically Erasable Programmable ROM), a RAM (Random Access Memory), etc. The memory 1002 may be also referred to as a register, a cache, a main memory (a main storage apparatus), etc. The memory 1002 can store executable programs (program code), software modules or the like for implementing the wireless communication method of an embodiment of the present invention.

The storage 1003 is a computer-readable recording medium, and may be constituted, for example, by at least one of a flexible disk, a floppy disk (registered trademark), a magneto-optical disk (such as a CD-ROM (Compact Disc ROM), a digital versatile disk, a Blu-ray disk (registered trademark)), a removable disk, a hard disk drive, a smart card, a flash memory (e.g., a card, a stick), a key driver, a magnetic stripe, a database, a server or any other suitable storage mediums. The storage 1003 may be referred to as an auxiliary storage device.

The communication apparatus 1004 is a hardware (transceiver device) performing communication between computers via a wired and/or wireless network, and is also referred to as a network device, a network controller, a network card, a communication module or the like, for example. In order to implement, for example, Frequency Division Duplex (FDD) and/or Time Division Duplex (TDD), the communication device 1004 may include a high frequency switch, a duplexer, a filter, a frequency synthesizer, and so on. For example, the above-described measuring unit, transmitting unit, and the like can be implemented by the communication device 1004.

The input apparatus 1205 is an input device (e.g., a keyboard, a mouse, a microphone, a switch, a button, a sensor, etc.) that receives input from the outside. The output apparatus 1206 is an output device (e.g., a display, a speaker, a light emitting diode (LED) light, etc.) that performs output to the outside. Further, the input apparatus 1205 and the output apparatus 1206 may be an integrated configuration (e.g., a touch screen).

In addition, the respective apparatuses such as the processor 1001 and the memory 1002 are connected by the bus 1007 that communicates information. The bus 1007 may be constituted by a single bus or by different buses between the apparatuses.

In addition, the wireless base station 10 and the user terminal 20 may comprise hardware such as a microprocessor, a digital signal processor (DSP), an ASIC (Application Specified Integrated Circuit), a Programmable Logic Device (PLD), an Field Programmable Gate Array (FPGA), etc., and the hardware may be used to implement a part of or all of the respective functional block. For example, the processor 1001 may be implemented by at least one of the hardware.

In addition, the terms used in present specification and/or the terms required for understanding present specification may be interchanged with terms having the same or similar meanings. For example, the channel and/or symbol can also be a signal (signaling). In addition, the signal can also be a message. The reference signal may also be simply referred to as RS, and according to applicable standards, it may also be referred to as a pilot, a pilot signal, or the like. In addition, a component carrier (CC) may also be referred to as a cell, a frequency carrier, a carrier frequency, or the like.

In addition, information, parameter, etc. described in the present specification may be represented by an absolute value, a relative value to a designated value or other corresponding information. For example, a wireless resource may be indicated by a specified index. Furthermore, equations or the like using these parameters are sometimes different from those explicitly disclosed in the present specification.

Names used for the above parameters are not restricted at any aspect. For example, various channels (e.g., Physical Uplink Contorol Channels (PUCCHs), Physical Downlink Control Channels (PDCCHs), etc.) and information units may be identified by any suitable names, so these various names allocated to the various channels and information elements are not restricted at any time.

Information, signal or the like described in the present specification may be represented using any of a variety of different technologies. For example, data, commands, instructions, information, signal, bit, symbol, chip, etc., referred to throughout the above description may represent using voltage, current, electromagnetic waves, magnetic fields or magnetic particles, optical fields or photons, or any combination thereof.

In addition, information, signals, and the like may be output from the upper layer to the lower layer, and/or from the lower layer to the upper layer. Information, signals, etc. can be input or output via a plurality of network nodes.

Information or signals input or output can be stored in a specific place (such as memory) or managed by a management table. Information or signals input or output may be overwritten, updated or supplemented. The output information, signals, etc. can be deleted. The input information, signals, etc. can be transmitted to other devices. The notification of the information is not limited to the manners/implementations described in the specification, and may be performed by other methods. For example, the notification of the information may be implemented through physical layer signaling (e.g., Downlink Control Information (DCI), Uplink Control Information (UCI)), high layer signaling (e.g., Radio Resource Control (RRC) signaling), broadcast information (Master Information Block (MIB), System Information Block (SIB) and the like), Media Access Control (MAC) signaling, other signals, or a combination thereof.

In addition, the physical layer signaling may be referred to as L1/L2 (Layer 1/Layer 2) control information (L1/L2 control signal), L1 control information (L1 control signal), and the like. In addition, the RRC signaling may also be referred to as a RRC message, and may be, for example, a RRC Connection Setup message, a RRC Connection Reconfiguration message, or the like. In addition, the MAC signaling can be notified, for example, by a MAC Control Unit (MAC CE).

In addition, the notification of the designated information (e.g., the notification of "X") is not limited to be explicitly performed, and may be performed implicitly (e.g., by not notifying the designated information or by the notification of other information).

Regarding determination or deciding, it may be performed by a value (0 or 1) represented by 1 bit, or by a true or false value (Boolean: true or false), or by comparison of numerical values (for example, comparison with a designated value).

Irrespective of whether the software is called software, firmware, middle-ware, micro-code, hardware descriptive term, or other names, the software should be broadly interpreted as instructions, instruction sets, codes, code segments, program codes, program, sub-program, software module, application, software application, software package, routine, sub-routine, object, executable file, execution thread, procedure, function and the like.

In addition, software, commands, information, etc. may be transmitted and received via a transmission medium. For example, in case that the software is transmitted from a web page, a server or other remote data source using wired technologies (such as coaxial cables, fibers, twisted pairs and digital subscriber lines (DSLs)) and/or wireless technologies (such as infrared ray, radio and microwave), these wired technologies and/or wireless technologies are included in the definition of the transmission medium.

In addition, the terms "system" and "network" can be used interchangeably in the present specification.

In addition, in the present specification, the terms "base station (BS)", "wireless base station", "eNB", "gNB", "cell", "sector", "cell group", "carrier", and "component carrier" can be used interchangeably in the present specification. The base station is sometimes also referred to as a fixed station, a NodeB, an eNodeB (eNB), an access point, a transmission point, a reception point, a femto-cell, a small cell, etc.

The base station is capable of accommodating one or more (for example, three) cells (also referred to as sectors). In a case where the base station accommodates a plurality of cells, an entire coverage area of the base station is capable of being divided into a plurality of smaller areas, and each smaller area is capable of providing communication services using a base station sub-system (for example, a small base station RRH for indoor use: a remote radio head). The terms "cell" and "sector" refer to a part of or an entirety of a coverage area of the base station and/or a sub-system of the base station that providing communication services.

In the present specification, the terms "mobile station (MS)", "user terminal", "user equipment (UE)", and "terminal" can be used interchangeably. Mobile stations are also sometimes referred to as a user station, a mobile unit, a user equipment, a wireless unit, a remote unit, a mobile device, a wireless device, a wireless communication device, a remote device, a mobile user station, an access terminal, a mobile terminal, a wireless terminal, a remote terminal, a handheld terminal, a user agent, a mobile client, a client, or other suitable terms by those skilled in the art.

In addition, the wireless base station in this specification can also be replaced with a user terminal. For example, respective manners/embodiments of the present invention can be applied to a configuration in which communication between a wireless base station and a user terminal is replaced with communication between a plurality of Device-to-Device (D2D). In this case, the function of the above-described wireless base station 10 can be regarded as a function of the user terminal 20. In addition, words such as "uplink" and "downlink" can also be replaced with "side". For example, the uplink channel can also be replaced with a side channel. Similarly, the user terminal in this specification can also be replaced with a wireless base station. In this case, the function of the user terminal 20 described above can be regarded as a function of the wireless base station 10.

The manners/implementations described in the present specification may be used alone or in combination, or may be switched in accordance with execution. In addition, orders of the processing steps, procedures, flow charts and the like of the respective manners/implementations described in the present invention may be changed as long as there is no contradiction. For example, in the methods explained in the present specification, elements of various steps are presented in illustrative order, but it is not limited to the presented particular order.

The respective manners/implementations described in the present specification may be applied to Long Term Evolution (LTE), LTE-A (LTE-Advanced), LTE-B (LTE-Beyond), SUPER 3rd Generation Mobile communication system (SUPER 3G), International Mobile Telecommunications (IMT-Advanced), 4th generation mobile communication system (4G), 5th generation mobile communication system (5G), Future Radio Access (FRA), New-RAT (Radio Access Technology), New Radio (NR), New Radio Access (NX), New Generation FX (Future generation radio access), Global System for Mobile Communications (GSM (registered trademark)), Code Division Multiple Access 2000 (CDMA2000), Ultra Mobile Broadband (UMB), IEEE 802.11 (Wi-Fi (registered trademark)), IEEE 802.16 (WiMAX (registered trademark)), IEEE 802.20, Ultra Wideband (UWB, Ultra-WideBand), Bluetooth (registered trademark), a system using another proper wireless communication method and/or a next-generation system extended based thereon.

The term "based on" used in the present specification do not mean "only based on" unless it is explicitly stated. In other words, the "based on" means: "only based on" and "based at least on".

Any reference to an element using the names "first", "second", etc., as used in the specification and claims, does not fully limit the number or order of the elements. These names can be used in this specification as a convenient method of distinguishing between two or more elements. Thus, the reference to the first element and the second element does not mean that only two elements may be employed or the first element must prevail over the second element in several forms.

The terms such as "determining" used in the present specification comprise a wide variety of actions. For example, regarding "determining", calculating, computing, processing, deriving, investigating, looking up (e.g., the looking up in tables, databases, or other data structures), ascertaining, etc. can be regarded as performing "determining". In addition, regarding "determining", receiving (e.g., receiving information), transmitting (e.g., transmitting information), input, output, accessing (e.g., accessing data in the memory), etc. can be regarded as performing "determining". In addition, regarding "determination", "resolving", "selecting", choosing, establishing, comparing, etc. can be regarded as performing "determining". That is to say, regarding "determination", several actions can be considered as "determining".

When terms such as "including" "comprising" and variations of these are used in this specification or in claims, these terms are intended to be inclusive, like the term "provide". Furthermore, the term "or" used in the context of the present specification or claims does not mean exclusive or.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that measures radio quality by using reference signals transmitted by one base station using a plurality of transmitting beams, which include serving beams and candidate beams; and
a transceiver that transmits an indication related to beam failure in an upper layer in case where the radio quality measured by using reference signals transmitted using the serving beams satisfies a condition,
wherein in case where the radio quality measured by using reference signals transmitted using the serving beams satisfies the condition, the processor selects, based on a reception power of the reference signals, a receiving beam corresponding to one of the candidate beams, and
wherein the reference signals comprise both a synchronization signal block and a channel state information reference signal.

2. The terminal of claim 1, wherein the condition is that the radio quality is lower than a threshold.

3. A method comprising:
measuring radio quality by using reference signals transmitted by one base station using a plurality of transmitting beams which include serving beams and candidate beams; and
transmitting an indication related to beam failure in an upper layer in case where the radio quality measured by using reference signals transmitted using the serving beams satisfies a condition,
wherein in case where the radio quality measured by using reference signals transmitted using the serving beams satisfies the condition selecting, based on a reception power of the reference signals, a receiving beam corresponding to one of the candidate beams, and
wherein the reference signals comprise both a synchronization signal block and a channel state information reference signal.

4. A system comprising a base station and a terminal, wherein:

the base station comprises:
- a processor that controls transmission of reference signals used for measuring radio quality using a plurality of transmitting beams, which include serving beams and candidate beams, and the terminal comprises:
- a processor that measures radio quality by using the reference signals transmitted by the base station; and
- a transceiver that transmits an indication related to beam failure in an upper layer in case where the radio quality measured by using reference signals transmitted using the serving beams satisfies a condition,
- wherein in case where the radio quality measured by using reference signals transmitted using the serving beams satisfies the condition, the processor of the terminal selects, based on a reception power of the reference signals, a receiving beam corresponding to one of the candidate beams, and
- wherein the reference signals comprise both a synchronization signal block and a channel state information reference signal.

\* \* \* \* \*